W. B. RUGGLES.
MIXER AND DRIER.
APPLICATION FILED MAR. 9, 1911.
1,269,120.
Patented June 11, 1918.
5 SHEETS—SHEET 4.
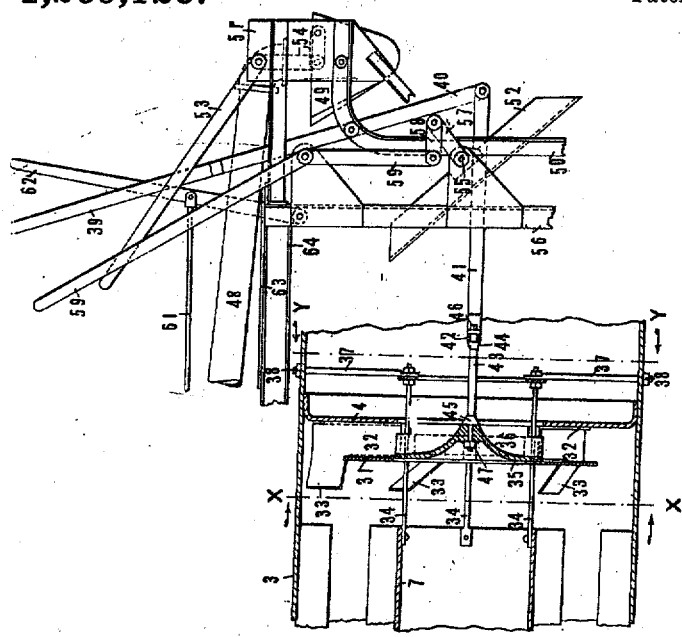
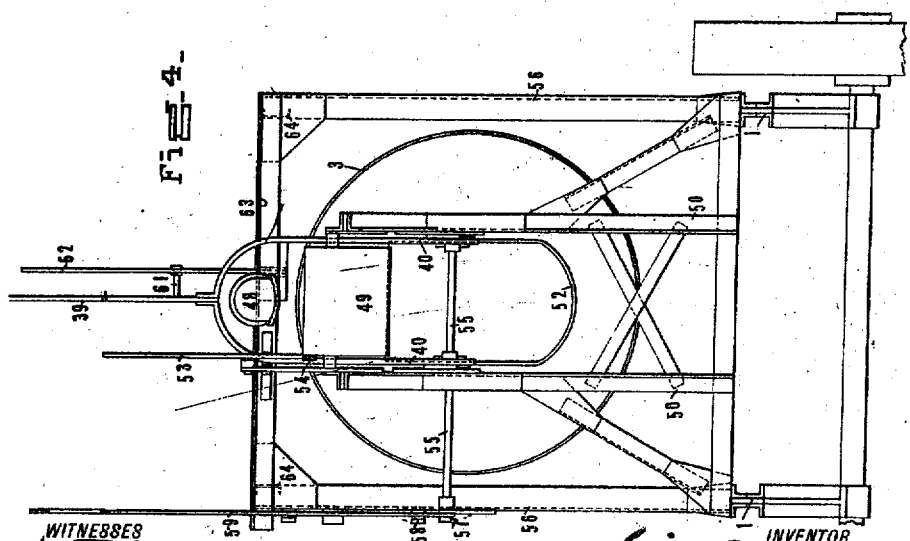
WITNESSES
INVENTOR
W. B. Ruggles
ATTORNEYS

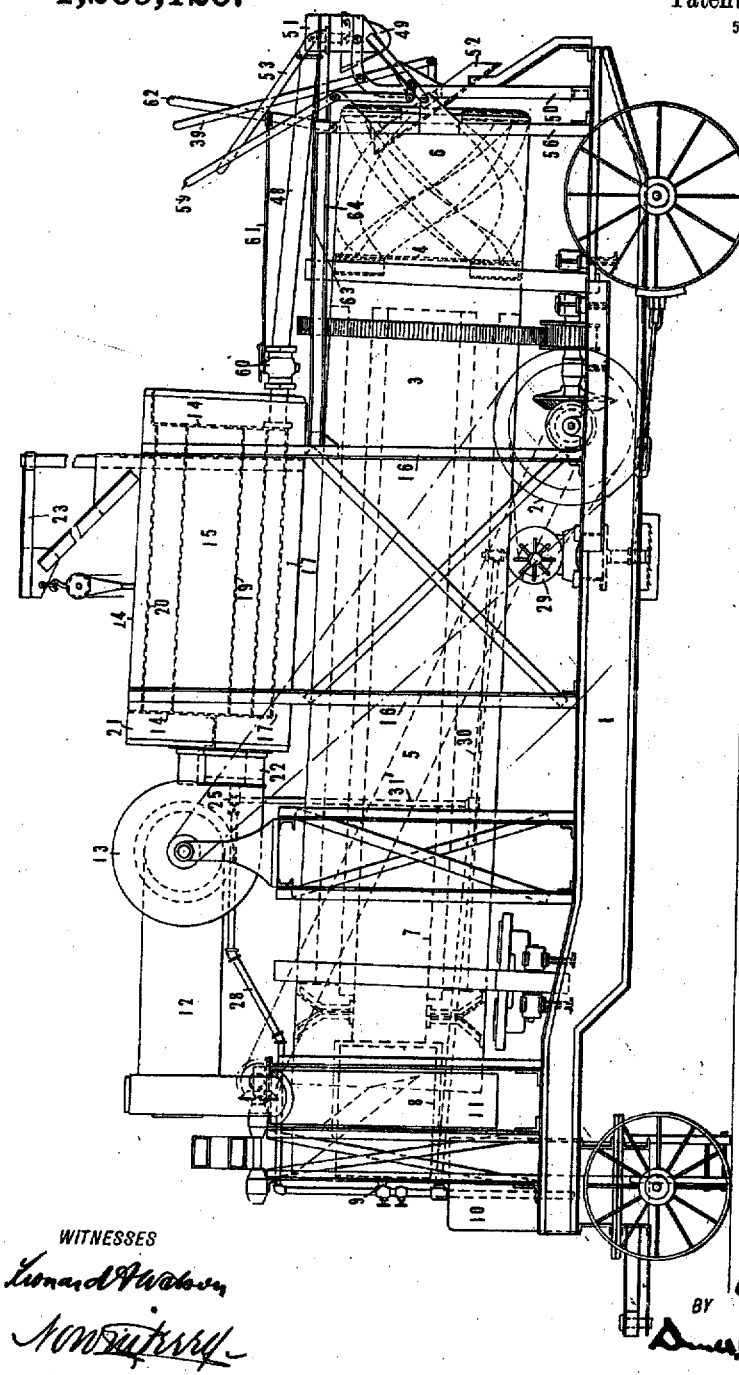

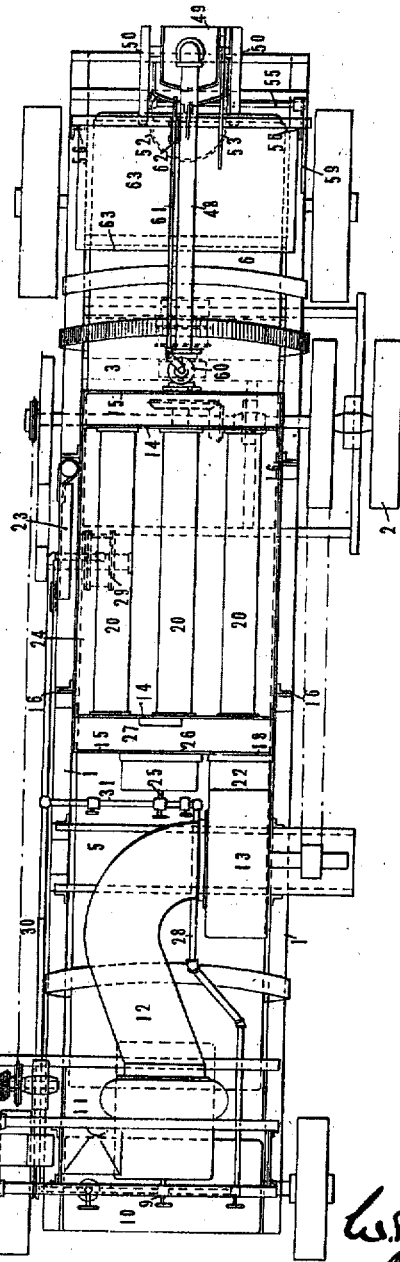

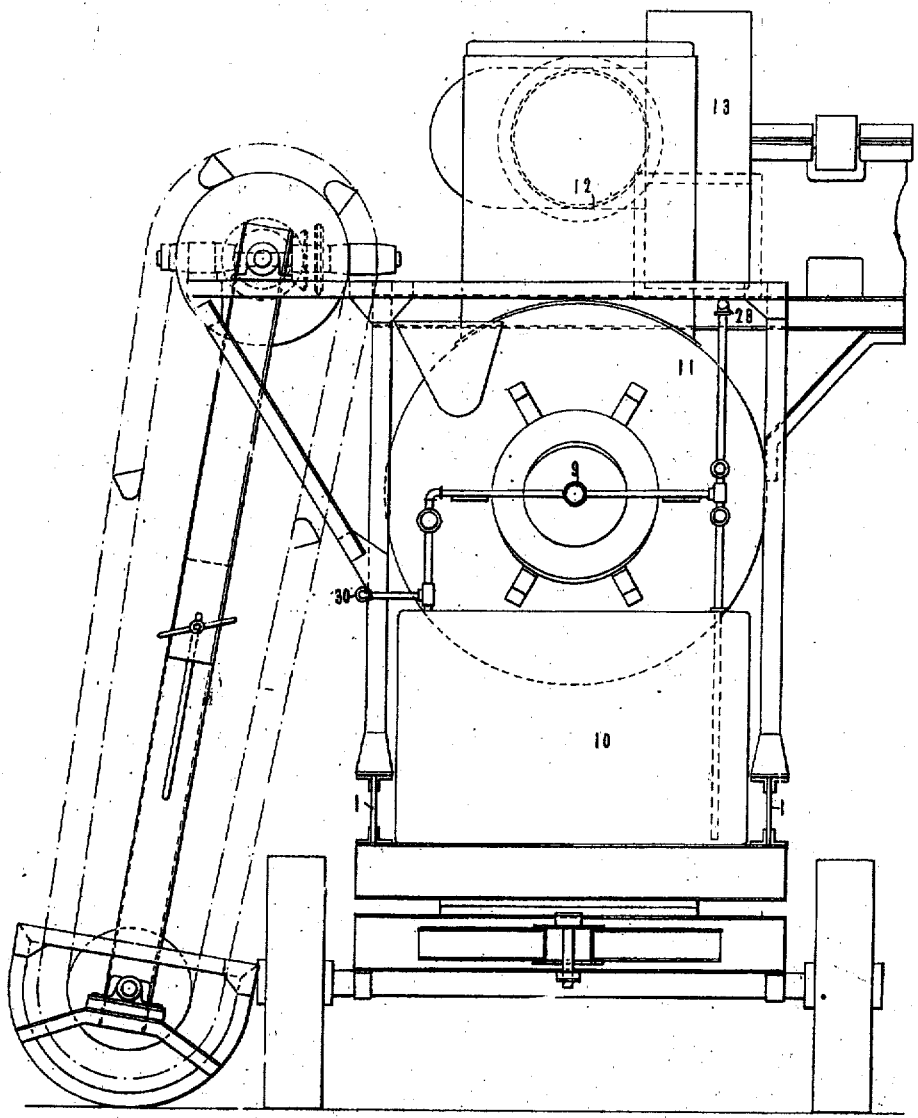

W. B. RUGGLES.
MIXER AND DRIER.
APPLICATION FILED MAR. 9, 1911.

1,269,120.

Patented June 11, 1918.
5 SHEETS—SHEET 5.

UNITED STATES PATENT OFFICE.

WILLIAM B. RUGGLES, OF BAYONNE, NEW JERSEY.

MIXER AND DRIER.

1,269,120.

Specification of Letters Patent.   Patented June 11, 1918.

Application filed March 9, 1911.   Serial No. 613,440.

*To all whom it may concern:*

Be it known that I, WILLIAM B. RUGGLES, a citizen of the United States, residing at Bayonne, in the county of Hudson and State of New Jersey, have invented certain new and useful Improvements in Mixers and Driers, of which the following is a full, clear, and exact description, such as will enable others skilled in the art to which it appertains to make and use the same.

This invention relates to driers, and with respect to its more specific features to a combined drying and mixing device.

One of the objects of the invention is to provide an apparatus of the type described with an efficient means for discharging material from the mixer and drier.

Another object is to provide a practical apparatus of the above type combined with a simple and efficient auxiliary means for heating material.

Another object is to provide an apparatus of the type described which includes a means whereby materials may be supplied to the mixer in a simple and efficient manner.

Another object is to provide an apparatus of the kind described with practical means for controlling the supply of materials to the mixer.

Another object is to provide an apparatus of the kind described with a practical means for measuring the quantity of material supplied to the mixer.

Another object is to provide a practical apparatus of the type described of such compact and durable construction that it may readily be transferred from place to place without impairing its efficiency.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings, wherein is illustrated one of the various possible embodiments of the invention, Figure 1 represents a side elevation of an apparatus of the kind described;

Fig. 2 represents a plan view of the apparatus;

Fig. 3 represents a front end elevation of the apparatus;

Fig. 4 represents a discharge end elevation of the apparatus;

Fig. 5 represents an enlarged side elevation of the discharge end of the apparatus showing the details of construction thereof, and the details of the measuring bucket and discharging devices;

Similar reference characters refer to similar parts throughout the various views of the drawings.

Figure 7:
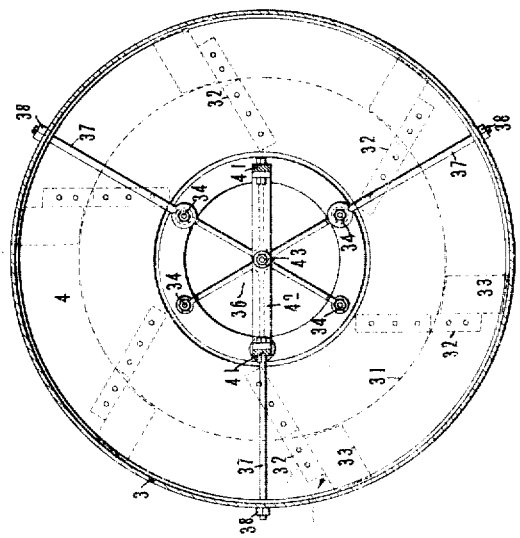
Fig. 7 represents an enlarged sectional elevation of the shell on the line Y—Y of Fig. 5, viewed from the exterior of the drier.
Figure 9:
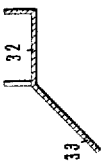
Fig. 9 is a section on the line X—X of Fig. 8.

The numeral 1 indicates a support or wagon body beneath which running wheels are preferably attached. The support may be of any suitable material or construction, but is preferably of a generally rectangular shape comprising metallic I-beams suitably spaced and braced to provide a substantial frame work to support the several devices composing the combined drier and mixer. The front running wheels are so joined to the support as to be capable of steering the same.

Although the structure is shown in the drawings as mounted on wheels it is to be understood that it may be mounted on a fixed support or base.

Mounted on the support 1 is a suitable set of gears adapted to receive motion from a wheel 2 to thereby rotate the apparatus. The combined drier and mixer consists of a rotatable cylindrical shell or drum 3 which is divided into two portions by a wall or plate 4. T..e portion 5 constitutes the drier and the portion 6 constitutes an integral extended receptacle adapted to receive and mix material. The shell is set upon the support in a slightly inclined position. The drier portion of the device has been described in my previous application Serial No. 597,610 filed December 16, 1910, hence only the general features of this drier will be here described.

The portion 5 of the shell constituting the drier concentrically incloses an inner flue 7 rigidly attached thereto by straps. The front end of the inner flue is enlarged to inclose a combustion chamber 8 and situated in juxtaposition to this combustion chamber is a fluid fuel burner 9. A tank 10 adapted to hold fluid fuel, for example fuel oil, is mounted on the support 1 immediately above the front wheels, and pipes lead from this tank to the fluid fuel burner. The front end of the drier drum is inclosed by a hood 11 which in turn communicates by a pipe 12 to an exhaust fan 13. The exhaust fan, in turn, communicates with an auxiliary heater, hereinafter described in detail.

It is to be understood that the drier may be used as a heater for heating substances to a temperature higher than that required for drying.

The liquid fuel supplied to the burner is ignited in the combustion chamber and the gases pass through the inner flue 7 toward the discharge end of the drum and thence back between this flue and the outer shell 3 to the front end of the drum, which opens into the hood 11. The gases pass into the hood, thence to the exhaust fan, from there to the auxiliary heater and thence to the atmosphere.

Material to be dried may be supplied to the drier drum by a bucket conveyer situated near its front or feed-end. The drum and inner flue are adapted to rotate, and the material fed into the feed-end is urged toward the rear-end on account of this rotation and the slightly inclined position of the shell.

The auxiliary heater consists of a rectangular open tank 14 surrounded by and spaced from a supporting wall 15, which, in turn, is suitably supported upon the frame 1 by braced angle bars 16. The space 17 between the wall and tank is adapted to receive heating gases. The gases enter this space through an opening 18 and flow either through the tubes 19 passing through the lower portion of the tank, or flow along the outer surface of the tank through the space 17. The gases return through the tubes 20 situated in the upper portion of the tank and pass thence to the atmosphere through the space 21. The auxiliary heater is connected to the exhaust fan by a pipe 22, and is adapted to receive and be heated by the gases flowing from the drier.

The auxiliary heater may be employed to heat material to be used in the mixer. For example, it is particularly useful in heating bitumen or similar material when the apparatus is used for road-making purposes. The material to be heated is raised by a derrick 23 or other suitable means and delivered to the tank opening 24 into which it is discharged. In heating such a substance as bitumen it is necessary to expend quite a large amount of heat in order to raise the substance to or near its melting point, and it has hence been found preferable in practice to use a fluid fuel burner or similar heating device in addition to the heat conveyed to the auxiliary heater from the drier drum. In this embodiment the fluid fuel burner 25 is placed in juxtaposition to an opening 26 in the wall surrounding the reservoir or tank of the auxiliary heater and is adapted to supply highly heated gases directly to the space surrounding the tank. A combustion chamber lined with fire brick is provided for the burner, and a fire brick plate 27 is secured on the wall of the tank immediately opposite the burner, so that the highly heated gases which rush to this point may be diverted to one side and a burning through of the wall of the tank prevented.

The fuel supply tank 10 mentioned above is connected by pipe 28 to the fluid fuel burner 25 and to an air pump 29 by pipe 30. The fluid fuel burner is also connected to the air pump by a pipe 31'. Air is forced into the fuel supply tank from the air pump and forces the liquid fuel through the pipe 28 to the fluid fuel burner. At the same time, a supply of air is delivered to the burner through the pipe 30 and mixing with the fluid fuel forms a combustible mixture which is sprayed into the combustion chamber of the auxiliary heater and ignited.

Figure 6:
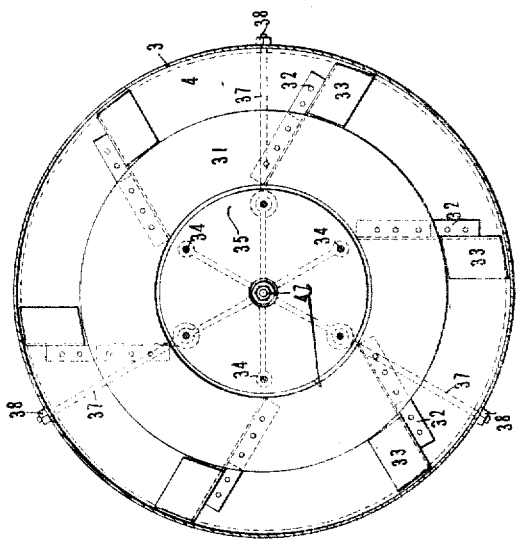
Fig. 6 represents an enlarged sectional elevation of the shell on the line X—X of Fig. 5, viewed from the interior of the drier.
Figure 8:
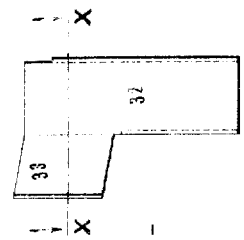
Fig. 8 is a detail view of a U-bar forming part of the drier discharge device.

The partition at the rear end of the drier is provided with a device adapted to control and provide a substantially constant supply of material from the drier. The device comprises a circular plate 31 which is spaced from and attached to the inner surface of the discharge end wall 4, as clearly shown in Figs. 5 and 6, by means of projecting members, preferably U-bars 32 provided with lipped portions 33 and arranged in planes oblique to the radial planes of the drum. As will be noted, the lipped portion projects beyond the circular plate. In view of their position between the circular plate and the wall, these bars serve as elevating devices or buckets, and are adapted to scoop up material which has been urged to the discharge end by rotation. The material is elevated and delivered from the buckets onto a movable, conical deflector adapted to move on guide rods 34. The plate 31, which is rotatable with the drum, is provided in order that a substantially constant supply of material may be provided to the U-bars or buckets. It is to be noted in this connection that when the supply of material fed in at the head end of the drum is maintained at such rate that material is banked up at the discharge end of the drum to a point above the lower edge of the circular plate, the buckets 32 will travel through a substantially constant depth of material and on account of this fact will take up substantially equal amounts of material upon each rotation. The total discharge into the mixture will, therefore, be practically constant. It will, accordingly, be quite obvious that by providing an indicating device of some sort, as a gong, to denote the number of revolutions made by the drier that a means for measuring and controlling the total quantity of material supplied from the drier drum to the mixer is provided.

The common wall 4 has an opening providing a communicating passage through which the conical deflector is adapted to discharge material from the drum into the mixer. As will be noted, the deflector has two principal functions according to its position. In one position it is adapted to discharge material from the drum and in the other position it is adapted to close the passage between the drum and the mixer. The deflector (see Fig. 5) consists of a casting comprising a flat portion 35 and a truncated conical projection 36. To the deflector are secured a number of vanes. The rods 34 are secured to the inner flue 7 and are rotatable therewith. They are adapted to pass through the flat portion of the deflector and to guide its backward and forward movement. The rods are suitably braced by stays 37 which pass through and are attached by nuts 38 to the outer side of the shell.

The movable deflector is adapted to be moved back and forth by a pivoted lever 39 provided with arms 40 depending therefrom to form a stirrup-like projection. To the lower extremities of these arms are pivotally attached arms 41, which in turn are pivotally attached to the cross bar 42. The cross bar is so attached to the movable deflector that the latter may rotate with the shell 3. This movable connection is provided by means of a rod 43 having flared projections 44 and 45. The flared projection 44 abuts the cross bar and has a projecting threaded finger 46, which passes through a perforation forming a bearing in the cross bar, and is secured to the cross bar by a nut and washer in such manner that the rod 43 may rotate. The flared projection 45 abuts the truncated portion of the conical projection of the movable deflector, to which it is secured by means of a projecting threaded finger 46 which passes through the surface of the conical projection and is held in place by a nut on the inside thereof. It will readily be seen from the above description that when the movable deflector rotates with the drum the rod 43 will also rotate in the bearing in the cross bar 42. The lever 39 and cross bar, however, remain stationary with respect to the rotative movement of the drum, and by reciprocating the lever the deflector may be moved in like manner.

The material contained in the tank 14 of the auxiliary heater is adapted to be supplied to the mixer and to be agitated therein with the material discharged from the drier drum. A pipe 48 passes from the bottom of the tank 14 along the top of the shell and overhanging the end thereof is adapted to deliver into a measuring bucket 49. This measuring bucket is adapted to control the amount of bitumen or other material supplied to the mixer. The bucket is pivotally attached to suitably braced uprights 50, which in turn are secured to the frame 1, and which support side plates 51. The bucket is adapted to tilt and discharge its contents into the mixer through a spout 52, which will be described later. An arm 53 is pivotally attached to the bucket, which in turn is secured to a bell crank lever 54 attached to the side plates 51, and by raising this lever the bucket may be tilted and discharged as above described.

The mixer, of course, is adapted to agitate material by means of its rotary movement, but to insure a more perfect mixing, spiral vanes may be provided on the inside of the mixer as shown in Fig. 1. The rear end of the mixer is provided with a plurality of Z-shaped buckets which are adapted to raise material therein and to discharge it upon the rotatable spout 52. The spout is attached to an arm 55 which is rotatably joined to the upright angle bars 50 and 56. Arm 55 is also attached to levers 57 and 58 which are in turn attached to a bell crank lever 59 secured to a plate projecting from the upright angle bar 56. As has been mentioned, the spout is rotatable, and it is to be noted that when its outer end is turned upward it is adapted to receive material from the measuring bucket 49 and to deliver it into the mixer, and that when the outer end is deflected downward the spout is adapted to guide outwardly the material discharged thereon from the Z-shaped buckets in the mixer.

It will, of course, be obvious from the foregoing that after a suitable amount of binding material has been placed in the mixer the outer end of the spout may be held in its upright position and upon rotation of the mixer the material discharged upon the spout from the buckets will be deflected back into the mixing chamber, thus preventing discharge of the material from the mixer.

The pipe 48 connecting the auxiliary heater and measuring bucket is provided with a valve 60 which is operated by an arm 61 connected to a lever 62. As will be noted, the levers for operating the measuring bucket, movable deflector, movable spout and valve in the discharge pipe leading from the auxiliary heater, are conveniently located together at the end of the cylinder and a suitable platform 63 supported by the channel bars 64 is provided above the cylinder at its end, so that an operator may stand thereon and conveniently control the movements of these various devices.

It is to be understood that the various discharge and control devices may be used with the mixer or drier alone as well as with the two in combination.

The operation of the device is as follows: Power for rotating the device is supplied to the wheel 2 and fuel oil is supplied to the burner for the device and ignited. The gases of combustion are sucked through the apparatus by the exhaust fan, and when the parts have been sufficiently heated material is supplied at the front end by the bucket conveyer. The movable deflector may now be moved to close the discharge opening of the drier into the mixer and the dried material permitted to bank up until it reaches a point above the plate at the discharge end. Meanwhile a supply of material, for example bitumen, is hoisted and placed in the auxiliary heater and the burner connected therewith is supplied with fuel oil, which is ignited, and serves to heat up the material in the heater. The burner is now shut off and the exhaust gases are relied upon to maintain a sufficient heat to melt the material in the heater. The movable deflector is now opened and a measured quantity of material is fed into the mixer. The bitumen or other material having been sufficiently heated a quantity is measured out by means of the tilting bucket and supplied to the mixer, the movable spout being upraised to receive and guide the supply from the bucket into the mixer. The deflector being closed, the materials in the mixer are thoroughly agitated and incorporated one with the other. At a suitable time, subsequently, the movable spout is lowered and the Z-buckets in the mixer elevate the material and discharge it onto the spout which guides the mixed material from the device.

It will thus be seen that there is provided a simple, practical apparatus, wherein the objects of the invention are achieved.

The following are some of the advantages of this invention:

The combined mixer and drier present at once a simple and efficient device, which in view of its structure secures a great economy in materials and space. A saving in power is also effected by the use of a single device for driving both mixer and drum. The provision of a movable deflector which serves both as a discharge member and as a closure for the drum represents a handy and simple means for accomplishing this function, and the movable spout secures a similar advantage for the mixer. The use of an auxiliary heater in connection with the mixer and drier insures a saving of space, and, further, the connection of the heater with the exhaust fan secures a conservation in the heat developed by the apparatus. It appears in view of the contemplated use of the machine that, as mentioned previously, it will be possible to render plastic such substances as bitumen in the auxiliary heater by means of the burner provided for that purpose, and subsequently to maintain this plastic state by means of the exhaust heating gases. The provision of devices for measuring the material supplied by the heater to the mixer, as well as that supplied by the drum, provides a ready means for securing mixtures of the substances supplied in varying proportions, and furthermore the simplicity of these control devices and their practical character make them suitable for operation by unskilled labor. In fact, the whole device requires only limited attention and may be readily handled by one or two men.

As the drum is inclined to the horizontal, the material in the drum will gradually travel toward its lower end as the drum rotates, the vanes 100 secured to the inner wall of the drier portion and the spiral vanes 101 on the wall of the mixer portion contacting the material and assisting in its advance, besides lifting greater amounts of material than would result without the use of vanes. The spiral vanes of the mixer positively move the material toward the discharge opening as the mixer rotates, also lifting and dropping the material from time to time during its passage therethrough so as to obtain a more thorough mixing.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. In an apparatus of the character described, in combination, a rotary drum, means adapted to convey material therethrough along the walls thereof, a second rotary drum attached to said first-mentioned drum adjacent the point of collection of material contained therein, a wall separating said drums and having an opening, means adapted to be interposed in the path of the material to provide a uniform depth of material adjacent said opening, and means adapted to convey the material from said portion of uniform depth and discharge the material through said opening.

2. In an apparatus of the character described, in combination, a rotary drier drum, means adapted to heat said drum, means to convey material therethrough, a rotary mixer drum attached to said drier drum adjacent the end of the path of the material, said drums being provided with a common wall therebetween having an opening, a plate spaced from said wall and preserving a passageway between the lateral walls of the drum, and means adapted to convey the material in the drier between the first-mentioned wall and said plate and through said opening.

3. In an apparatus of the character described, in combination, a rotary drier drum, means adapted to heat said drum, means to convey material therethrough, a rotary mixer drum attached to said drier drum adjacent the end of the path of the material, said drums being provided with a common wall therebetween having an opening, a plate spaced from said wall and providing a passageway between the lateral walls of the drum, buckets adapted to raise the material in said passageway, and means to discharge the material through said opening.

4. In an apparatus of the character described, in combination, a rotary drier drum, means adapted to heat said drum, means adapted to convey material therethrough, a mixer attached to said drum adjacent the point of collection of material, a passageway between said drier and said mixer, a deflector mounted on said drum and adapted to rotate therewith, and means adapted to move said deflector to permit or prevent discharge of material through said passageway.

5. In an apparatus of the character described, in combination, a rotary drier drum, means adapted to heat said drier drum, means adapted to convey material therethrough, a rotary mixer attached to said drum at the end of the path of the material, a passageway between the drier and the mixer, an outlet passageway from the mixer, a deflector mounted on the drum to rotate therewith, means adapted to move said deflector to permit or prevent discharge of material from said drier to said mixer, a second deflector, and means to move said second deflector to permit or prevent discharge from said mixer.

6. In an apparatus of the character described, in combination, a drier drum adapted to receive heating gases and thereby dry material, said drum having a receptacle adapted to receive and mix material, an auxiliary heater adapted to heat material, and a pipe connecting said drum and said heater and adapted to direct heating gases from said drum into said heater.

7. In an apparatus of the character described, in combination, a mixer, a drier drum adapted to supply dried material to said mixer, and means adapted to control the amount of material supplied from said drum to said mixer comprising a plate and buckets secured within said drum, said plate being adapted to determine a substantially constant supply of material to said buckets.

8. In an apparatus of the character described, in combination, a mixer, a rotatable drier drum adapted to deliver material thereto, and means adapted to control the supply of material from said drum to said mixer comprising a plate secured to said drum and rotatable therewith and buckets attached to the discharge end of said drier and to said plate, said plate being adapted to determine a substantially constant depth of material in the path of rotation of said buckets.

9. In an apparatus of the character described, in combination, a mixer, a rotatable drier drum adapted to supply material to said mixer, having a discharge opening, means adapted to rotate said drum and thereby urge material toward said discharge opening, and means to control the supply of material from said drum to said mixer comprising a plate spaced from and secured to the discharge end of said drum and buckets secured in the space between said plate and said discharge end, each of said buckets being provided with a lip adapted to deflect material into each of said buckets.

10. In an apparatus of the character described, in combination, a rotatable drier drum having an opening, means adapted to close said opening comprising a movable plate having a curved portion adapted to rotate with said drum, a rod attached to said plate, a cross bar, said cross bar having a portion adapted to receive and loosely hold said rod and to thereby permit said rod to rotate, means adapted to move said cross bar and to thereby move said plate backward and forward, and a rotatable mixer communicating with said drum, the movement of said plate being adapted to establish and cut off communication between said drum and said mixer.

11. In an apparatus of the character described, in combination, a rotatable drier drum, a mixer, said mixer being an integral extension of said drum, a partition dividing said mixer and said drum having an opening adapted to establish communication between said drum and mixer, means adapted to close said opening comprising a movable deflecting plate having a curved peripheral portion adapted to rotate with said drum, a rod attached to said plate, a cross bar, said cross bar having a portion adapted to receive and loosely hold said rod and to thereby permit said rod to rotate, and means adapted to move said cross bar and to thereby move said plate backward and forward.

In testimony whereof I affix my signature, in the presence of two witnesses.

WILLIAM B. RUGGLES.

Witnesses:
LAURA E. SMITH,
ARCHIBALD K. TOWERS.